March 8, 1966 J. GOODMAN 3,239,368
METHOD OF PREPARING THIN FILMS ON SUBSTRATES BY AN ELECTRICAL DISCHARGE
Filed April 26, 1962
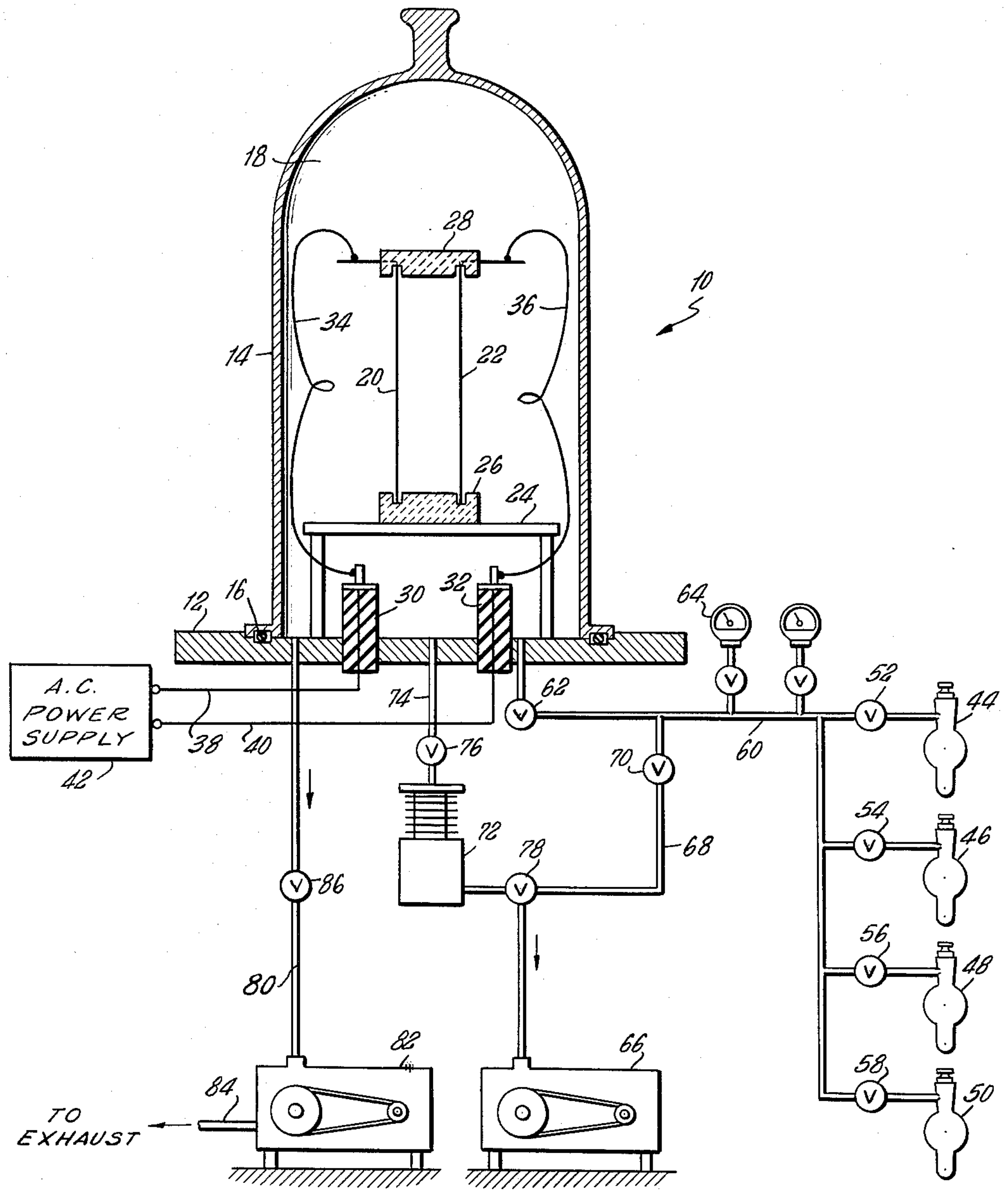
INVENTOR.
JEROME GOODMAN
BY Amster & Levy
ATTORNEYS United States Patent Office 3,239,368

Patented Mar. 8, 1966

3,239,368
METHOD OF PREPARING THIN FILMS ON SUBSTRATES BY AN ELECTRICAL DISCHARGE

Jerome Goodman, Long Island City, N.Y., assignor to NRA, Inc., Long Island City, N.Y., a corporation of New York Filed Apr. 26, 1962, Ser. No. 190,502
4 Claims. (Cl. 117—93.1)

The present invention relates generally to a process for producing extremely thin films of chemical compounds, and in particular to a method for forming thin films by a gas phase reaction of volatile chemical compounds in an electric discharge. Advantageously, films of ceramic, semiconductor, lubricating, and dielectric materials may be prepared in accordance with the present invention.

Conventionally, thin films of a wide variety of relatively simple compounds may be prepared by evaporation or sputtering techniques. For the preparation of such thin films, the bulk material of the desired simple compound is heated under a vacuum and the resulting vapor is deposited on a substrate serving as a relatively cool vapor-collecting surface. Such known techniques are usually limited to materials which can be prepared in bulk form and are suitable for evaporation. Many compounds are too refractory to be evaporated or sputtered satisfactorily or may decompose, oxidize, or otherwise react on heating such that a thin film of the desired final composition is not attained. It is also possible that one constituent may be evaporated (i.e., a metal) followed by a chemical reaction of the thus evaporated film (i.e. oxidation), but the resultant films may be too thin, chemically non-uniform in depth, or have physical properties resulting from the reaction which render them non-adherent or physically discontinuous.

Broadly, it is an object of the present invention to provide a method for the manufacture of thin films which obviates one or more of the aforesaid difficulties. Specifically, it is within the contemplation of the present invention to provide a process for forming thin films of inorganic chemical compounds having controlled thickness, uniformity, and other properties which render such films particularly suitable for use as dielectrics, semiconductors, and lubricating films, and other uses which will be obvious to those skilled in this art.

It is a further object of the present invention to provide a process for the manufacturing of films of inorganic chemical compounds by which relatively thin films, of the order of one micron and less in thickness, may be formed which are substantially hole-free and uniform in thickness, composition, and physical and electrical properties.

In accordance with method aspects of the present invention, a thin film of an inorganic chemical compound is manufactured by preparing a mixture of volatile gases containing the several elements of the chemical compound in an evacuated chamber at controlled partial pressures in the presence of a substrate. Thereupon a gaseous electrical discharge is initiated in the chamber in the region of the substrate and continued until the thin film of desired thickness is formed on the substrate.

The above brief description, as well as other objects, features, and advantages of the present invention will be more fully appreciated by reference to the following detailed description of presently preferred method aspects of the invention, typical illustrative products which may be prepared, and suitable processing apparatus, when taken in conjunction with the accompanying drawing, wherein:

The single figure is a schematic diagram of typical apparatus which may be employed in the preparation of thin film inorganic chemical compounds in accordance with the present invention.

Preliminary to a description of typical apparatus and a number of illustrative inorganic chemical compounds which may be prepared in accordance with the present invention, a generalized description follows of my process, including operating parameters, variables, and the like such that the many and varied chemical compounds which may be prepared in accordance with the invention will become apparent to those skilled in the art.

The elements which are to appear in the final chemically complex compound are introduced as part of volatile starting compounds, preferably selected so that other elements in the starting materials which are not required in the final chemically complex compound are easily removable. Typically, the undesired elements will form volatile removable products which may be readily removed from the processing region or which remain in the thin film in innocuous forms which do not affect the physical, chemical, or electrical properties of the final film. By the described techniques, it is possible to start wiht as complex a mixture of compounds as desired and to form complex compounds not otherwise obtainable which are of the required chemical, physical, and electrical properties. As a practical matter, it is usually not necessary to determine the stoichiometry of either the volatile starting compounds or of the final chemically complex compound since only the properties of the final material need be ascertained to determine their suitability for their intended purposes. However, it is essential in in accordance with the invention to employ starting materials that are volatile and will supply the desired elements for the final complex inorganic compound. Preferably, the volatile starting materials should have a vapor pressure which is above .1 mm. of mercury at a room temperature of about 20° C. It is possible to employ volatile starting materials which have lower vapor pressures at room temperature but whose vapor pressures may be elevated by operating the present process at appropriately higher temperatures. The relative amounts of the volatile starting materials or compounds, and therefore the stoichiometry of the produced thin film, can be controlled by simply varying the individual pressures of the several volatile starting compounds in the evacuated chamber. The separate starting components may be supplied from individual sources or from solutions containing two or more of the volatile compounds in a mixture of appropriate composition.

Depending upon the desired chemical constituents of the final inorganic thin film, the volatile starting compound or compounds are introduced into an evacuated chamber. If the final thin film is to be substantially oxygen-free, the processing chamber should be evacuated to at least $10^{-3}$ mm. of mercury preliminary to introducing the mixture of volatile gases containing the several elements of the desired chemical compound. However, if the final chemical compound is oxygen-containing, it is not necessary to establish such a high degree of vacuum. In any eventuality, the total pressure within the evacuated chamber after the introduction of the controlled partial pressures of the several volatile starting materials and of the residual atmosphere should not be high enough to interfere with the initiation of the uniform gaseous electrical discharge.

Provision is made within the reaction chamber for the deposition or collection of the thin film on a substrate. This substrate for the deposition of the thin film may be the surfaces of the one or more electrodes within the reaction chamber, materials arranged in the region of the gaseous electrical discharge, or the bounding walls of the reaction chamber. The substrates may be of insulating or conducting materials, depending upon the intended use of the films formed in accordance with the present invention. In some instances, it may be desirable to form the films on relatively thin metallic coatings bonded or otherwise adhered to or onto underlying insulating bases. Suitable substrates may be prepared of stainless steel, nickel-chromium alloys, ceramics, and plastics. When using insulating materials, such as ceramics, plastics, and glass, it may be desirable to initially form a conductive coating onto the substrate to promote its usefulness as an electrode. However, it will be appreciated that such insulating substrates may be used as electrodes even in the absence of metallic coatings per se by appropriately selecting the frequency of the electrical discharge.

The conditions for establishing the discharge are subject to a latitude of variation and change. Generally, the spacing between the electrodes is not critical, will depend upon practical considerations and may be chosen at relative convenience. Greater electrode spacings require the application of corresponding higher voltages, but at the same time provide more physical room for the handling and mounting of the substrates or related jigs and fixtures.

The voltage is selected to be high enough to initially establish the electrical discharge and to supply current for deposition at a current density which is experimentally determined to be most appropriate for the specific material in preparation. The current density over the area upon which the thin film is formed will determine the rate of deposition of the thin film. In practical applications, the current density may be limited by the heat developed incident to film formation, and/or possible alteration in the physical properties of the film as a result of a too slow or too rapid deposition rate. Preferably, the electric discharge should be from an alternating current source and at a relatively high frequency of the order of 10 kilocycles since this tends to provide a relatively uniform electric discharge, prevents arcing, and produces the so-called skin effect which promotes the formation of films on insulators, it being recalled that as the process goes forward, the deposition must occur on an insulating surface.

The use of such discharge makes it possible to react otherwise stable starting gases so that the selection of the reactants is not limited to those highly reactive under ordinary conditions. Additional advantages of this technique are that the ion and electron bombardment clean the substrate surface and my chemical activation promote the formation of chemical bonds between the substrate and the deposited thin film. The utilization of volatile liquids as starting materials makes it possible to use distillation and other techniques to obtain them in high purity.

Referring now specifically to the drawing, there is shown typical apparatus, generally designated by the reference numeral 10, which is suitable for the production of extremely thin films of inorganic chemical compounds in accordance with the present invention, either on a batch or continuous flow basis. Specifically, the apparatus includes a base 12 which has mounted thereon a bell jar 14, sealed at its lower open end by an O-ring 16. The bell jar 14 provides an evacuable reaction chamber 18 which in this illustrative embodiment has mounted thereon spaced electrodes 20, 22. The electrodes may conveniently be thin rectangular sheets of appropriate electrically conductive material disposed in spaced parallel relation. These electrodes may directly receive the thin film or, in the alternative, may serve only as a means for establishing a discharge in the region therebetween, with an appropriate substrate or substrates mounted in that region.

The electrodes 20, 22 are supported on an insulating pedestal 24 between insulating electrode mounts 26, 28. The base 12 has mounted thereon insulating feed-through posts 30, 32, which are connected internally of the reaction chamber 18 to the electrodes 20, 22 by connecting wires 34, 36. The feed-through posts 30, 32 are connected by input leads 38, 40 to a conventional alternating current variable voltage and variable frequency power supply.

The several volatile starting materials are contained in individual storage vessels 44, 46, 48, 50, which are connected via individual metering valves 52, 54, 56, 58, to an inlet tube 60 which is in communication with the reaction chamber 18. A main control valve 62 is provided in the inlet tube 60, and provision is made for measuring the pressure therein by one or more pressure gauges 64.

In order to evacuate the reaction chamber 18 preliminary to the introduction of the several volatile starting materials from the storage vessels 44, 46, 48, 50, there is provided a vacuum fore pump 66 which is connected via an evacuating line 68 to the reaction chamber 18 through the inlet tube 60. An appropraite valve 70 is connected in the evacuating line 68 so as to permit the isolation of the fore pump 66 from the reaction chamber 18 when the system is sufficiently pumped down to permit the final evacuation through a diffusion pump 72. This diffusion pump 72 is connected directly to the reaction chamber 18 through a main evacuating line 74 having an appropriate valve 76 therein. The diffusion pump 72 also is connected to the evacuating line 68 through valve 78 to permit isolation of the diffusion pump 72 from the fore pump 66 when the system is being roughed down.

In the event that the apparatus 10 is to be employed on a continuous flow basis, there is provided an exhaust line 80 which is connected to an exhaust pump 82 having an exhaust port 84 to the atmosphere or to any suitable means for collecting the exhausted by-products from the reaction chamber 18. A valve 86 is provided in the exhaust line 80. When the system is to be employed on a batch basis, the valve 86 is closed and the exhaust pump 82 is not employed.

The desired vacuum is established in the reaction chamber 18 by pumping down with the fore pump 66 and the diffusion pump 72, as is generally understood. Thereupon, the several volatile starting materials are introduced into the reaction chamber 18 by opening one or more metering valves 52, 54, 56, 58 and observing the successive pressures within the reaction chamber 18 on the one or more gauges 64. After the metering valves are opened and closed in succession to build up the desired evaporable mixture within the reaction chamber 18, the main supply valve 62 is closed and the gaseous discharge is initiated for the required period.

When the system is to be employed on a continuous basis, the system is once again pumped down in a conventional fashion by employing the pumps 66, 72. The system is then placed into continuous operation by opening the several metering valves 52, 54, 56, 58 in the proper ratios to establish the several partial pressures within the reaction chamber 18, and simultaneously the exhaust pump 82 is placed into operation after opening exhaust valve 86 to cause a continuous flow of the gaseous mixture from the several supply vessels or reservoirs through the reaction chamber. When steady-state conditions are obtained for the continuous flow, the electrical discharge is initiated and is allowed to continue until the desired film thickness is obtained.

The resultant film may then be used as formed, or first subjected to high temperatures or other treatment to obtain the desired properties. For example, elements deposited in a fixed ratio may be oxidized to provide an oxide film of a desired composition.

For the purpose of giving those skilled in the art a better understanding of the invention, the following examples, illustrative of various classes of materials, are given. It should be understood that the compound names given to films formed by this invention refer to their nominal compositions, which by stoichiometric variations are generally different from their actual compositions.

CLASS I.—DIELECTRIC AND PIEZOELECTRIC CERAMICS

*Example 1.*—Lead titanate films were prepared as follows: The starting volatile liquids, tetraethyl lead, titanium tetrachloride and water vapor, were degassed in vacuum to remove atmospheric gases by conventional techniques, such as alternatively freezing, pumping under vacuum, and then allowing to thaw. Vapors of the reactants were then closed off in a bell jar reaction chamber which had been pumped down by an oil diffusion pump to a pressure in the range of $10^{-4}$ to $10^{-5}$ mm. Hg. The partial pressures of the reactants and the conditions of formation and deposition of the thin film are shown in the following table:

| | |
|---|---|
| Tetraethyl lead | 0.05–1 mm. of Hg, pref. 0.3–0.5 mm. |
| Titanium tetrachloride | 0.1 mm.–0.6 mm., pref. about 0.2 mm. |
| Water vapor | 0.5 mm.–5 mm., pref. 2–3 mm. |
| Discharge voltage | 900–2800 volts. |
| Distance between electrodes | 1 to 2 cm. |
| Frequency | 10–25 kc./sec. |
| Current density | .1–.5 ma./cm.$^2$. |
| Time | 2–15 minutes. |

A number of lead titanate thin films were prepared having thicknesses between about 0.1 to about 0.3 micron. They were prepared on stainless steel, glass, acrylic plastic, and ceramic substrates.

When tested as capacitors, thin insulating films of lead titanate deposited on a metal substrate showed power factors averaging about 10%, although some were as low as about 1%. Typical results of capacitance measurements when the second electrode was a ¼ inch diameter mercury drop are given in the table below:

| Sample No. | Capacitance, mfd. | Insulation Resistance, ohms | Power Factor, percent | Voltage Breakdown, volts |
|---|---|---|---|---|
| 1 | 0.06 | $5\times10^8$ | 6 | 26 |
| 2 | 0.37 | $10^7$ | 90 | 22.5 |
| 3 | 0.006 | $5.2\times10^9$ | 8.5 | 31.5 |
| 4 | 0.38 | $2\times10^{11}$ | 38 | 32 |

The above values are for thin films which had not been fired at high temperature or subjected to other subsequent treatment.

*Example 2.*—Zirconium titanate was prepared in a similar manner, except that the starting compounds were zirconium tetrachloride, titanium tetrachloride, and water.

*Example 3.*—Lead zirconium titanate was prepared in a similar manner, except that the starting compounds were tetraethyl lead, zirconium tetrachloride, titanium tetrachloride, and water.

*Example 4.*—A ceramic composition of lead, titanium, tin and oxygen was prepared in a similar manner, starting with tetraethyl lead, titanium tetrachloride, stannous chloride, and water.

CLASS II.—SEMICONDUCTING FILMS

*Example 1.*—Thin films of silicon carbide were deposited following the general procedure given above. The reactants were silicon tetrachloride, toluene (to supply the carbon), and hydrogen (which reacts with the chlorine). The silicon carbide was deposited on a substrate of molybdenum sheet. The partial pressures of the reactants and the other process conditions are shown in the following table:

| | |
|---|---|
| Silicon tetrachloride | 0.4–0.7 mm. |
| Toluene | 0.2–1 mm. |
| Hydrogen | 0.5–2.5 mm. |
| Discharge voltage | 600–3200 volts. |
| Distance between electrodes | 1 to 2 cm. |
| Current density | .5–1 ma./cm.$^2$. |
| Frequency | 10–25 kc./sec. |
| Time | 2–10 minutes. |

Typical measurements using a ¼ inch diameter mercury drop as a counterelectrode gave results in capacitance tests as listed below:

| Sample No. | Capacitance, mfd. | Insulation Resistance, ohms | Power Factor, percent | Voltage Breakdown, volts |
|---|---|---|---|---|
| 1 | 0.0023 | $0.18\times10^6$ | 27 | 20 |
| 2 | 0.0001 | $10^7$ | 28 | 15 |
| 3 | 0.00015 | $1.4\times10^8$ | 58 | 22 |
| 4 | 0.0011 | $1.6\times10^6$ | 100 | 120 |
| 5 | 0.0013 | $4.6\times10^6$ | 70 | 70 |
| 6 | 0.0063 | $2.5\times10^6$ | 11 | 60 |

Although the semiconducting characteristics of these films were not tested, silicon carbide is known to be a semiconductor.

*Example 2.*—A lead sulfide thin film was prepared following the general process of the invention. Tetraethyl lead at a partial pressure of between 0.1 and 0.2 mm., and hydrogen sulfide at a partial pressure of about 2 mm. were reacted. The resultant lead sulfide thin film was deposited on a steel substrate. The resulting film was strong and adherent and was also suitable as a dry lubricating film for high temperature use. This film also showed photovoltaic properties.

CLASS III.—LUBRICATING FILMS

*Example 1.*—A lead fluoride thin film on a steel substrate was prepared from tetraethyl lead and hydrogen fluoride. The tetraethyl lead was used in a partial pressure between about 0.1 and 0.2 mm., and the hydrogen fluoride between about 1.5 and 2.5 mm. Several half-hour runs at a current density of about 0.1 ma./cm.$^2$ were made to prepare continuous film coatings having thicknesses of about 6 microns which were useful as lubricating films.

CLASS IV.—DIELECTRIC AND REFRACTORY FILMS

*Example 1.*—Silicon oxide films were prepared according to this invention, with silicon tetrachloride and water employed as the starting compounds.

*Examples 2, 3, 4.*—Aluminum oxide, tin oxide, and zirconium oxide were prepared from water and, respectively, aluminum trichloride, stannous chloride, and zirconium tetrachloride.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

What I claim is:

1. A method for the manufacture of a thin and uniform film of an inorganic chemical compound including the steps of preparing a mixture of volatile gases selected from the group consisting of inorganic gases and organometallic gases containing the several elements of said chemical compound in an evacuated chamber, with controlled partial pressures in ratios determined by the stoichiometry of said chemical compound and totalling less than 10 mm. of mercury and in the presence of a substrate which provides a film-deposition area, initiating a non-arcing electrical discharge in said chamber in the region of said substrate which discharge is substantially uniform over said film-deposition area, and continuing said discharge until a thin and uniform film of a desired thickness is formed on said film-deposition area of said substrate.

2. The method according to claim 1 wherein said non-arcing electrical discharge is provided by an alternating current source.

3. A method for the manufacture of a thin and uniform film of an inorganic chemical compound including the steps of preparing a mixture of volatile gases selected from the group consisting of inorganic gases and organometallic gases containing the several elements of said chemical compound in an evacuated chamber, with controlled partial pressures in ratios determined by the stoichiometry of said chemical compound and totalling less than 10 mm. of mercury and in the presence of a substrate which provides a film-deposition area, initiating a non-arcing electrical discharge in said chamber in the region of said substrate which discharge is substantially uniform over said film-deposition area, and continuing said discharge until a thin and uniform film of less than ten microns thickness is formed on said film-deposition area of said substrate.

4. A method for the manufacture of a thin and uniform film of an inorganic chemical compound including the steps of preparing a mixture of volatile gases selected from the group consisting of inorganic gases and organometallic gases containing the several elements of said chemical compound in an evacuated chamber, with controlled partial pressures in ratios determined by the stoichiometry of said chemical compound and totalling less than 10 mm. of mercury and in the presence of a substrate which provides a film-deposition area, initiating a non-arcing alternating current electrical discharge in said chamber in the region of said substrate which discharge is substantially uniform over said film-deposition area, and continuing said discharge until a thin and uniform film of less than ten microns thickness is formed on said film-deposition area of said substrate.

References Cited by the Examiner

UNITED STATES PATENTS

| | | | |
|---|---|---|---|
| 2,685,535 | 8/1954 | Nack | 117—93.3 |
| 2,932,591 | 4/1960 | Goodman | 117—106 |
| 2,955,998 | 10/1960 | Berghaus et al. | 204—192 |
| 2,964,427 | 12/1960 | Rheinberger et al. | 204—192 |
| 2,978,316 | 4/1961 | Weir | 204—164 |
| 2,993,467 | 7/1961 | Gatti | 117—106 |
| 3,014,815 | 12/1961 | Lely | 117—106 |
| 3,069,283 | 12/1962 | Coleman | 117—106 |
| 3,085,913 | 4/1963 | Caswell | 204—192 X |

FOREIGN PATENTS

| | | |
|---|---|---|
| 795,191 | 5/1958 | Great Britain. |

JOHN H. MACK, *Primary Examiner.*

MURRAY TILLMAN, *Examiner.*